United States Patent
Fukuda et al.

(10) Patent No.: US 9,251,784 B2
(45) Date of Patent: Feb. 2, 2016

(54) REGULARIZED FEATURE SPACE DISCRIMINATION ADAPTATION

(71) Applicant: INTERNATIONAL BUSINESS MACHINES CORPORATION, Armonk, NY (US)

(72) Inventors: Takashi Fukuda, Kanagawa-ken (JP); Vaibhava Goel, Chappaqua, NY (US); Steven J. Rennie, Yorktown Heights, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 174 days.

(21) Appl. No.: 14/060,972

(22) Filed: Oct. 23, 2013

(65) Prior Publication Data

US 2015/0112669 A1     Apr. 23, 2015

(51) Int. Cl.
*G10L 19/02*     (2013.01)
*G10L 15/065*    (2013.01)
*G10L 15/02*     (2006.01)

(52) U.S. Cl.
CPC .............. *G10L 15/065* (2013.01); *G10L 15/02* (2013.01)

(58) Field of Classification Search
CPC ....... G10L 15/08; G10L 15/063; G10L 15/14; G10L 15/142; G10L 15/20; G10L 2015/0635; G10L 15/065; G10L 15/06; G10L 15/02; G10L 15/144; G10L 17/20
USPC ............. 704/1–10, 234, 243–245, 256.2, 203
See application file for complete search history.

(56) References Cited

U.S. PATENT DOCUMENTS

| 2008/0010057 A1* | 1/2008 | Chengalvarayan et al. ...... 704/9 |
| 2010/0138223 A1* | 6/2010 | Koshinaka ................... 704/245 |

FOREIGN PATENT DOCUMENTS

| JP | 07-219599 | 8/1995 |
| JP | 08-022296 | 1/1996 |
| JP | 08-110792 | 3/1996 |
| JP | 08-241092 | 9/1996 |
| JP | 2000-081893 | 3/2000 |
| JP | 2002-366187 | 12/2002 |
| JP | 2003-122388 | 4/2003 |
| JP | 2007-052165 | 3/2007 |
| JP | 2008-064849 | 3/2008 |
| JP | 2008-209698 | 9/2008 |

(Continued)

OTHER PUBLICATIONS

Povey et al., "FMPE: Discriminatvely Trained Features for Speech Recognition", 2005 IEEE International Conference on Acoustics, Speech, and Signal Processing, Mar. 2005. (4 pages).

(Continued)

*Primary Examiner* — Huyen Vo
(74) *Attorney, Agent, or Firm* — Tutunjian & Bitetto, P.C.; Vazken Alexanian (57) ABSTRACT

A method and apparatus are provided for training a transformation matrix of a feature vector for an acoustic model. The method includes training the transformation matrix of the feature vector. The transformation matrix maximizes an objective function having a regularization term. The method further includes transforming the feature vector using the transformation matrix of the feature vector, and updating the acoustic model stored in a memory device using the transformed feature vector.

16 Claims, 4 Drawing Sheets

(56) References Cited

FOREIGN PATENT DOCUMENTS

| JP | 2010-054588 | 3/2010 |
| JP | 2011-053312 | 3/2011 |
| JP | 2012-042957 | 3/2012 |

OTHER PUBLICATIONS

Zheng et al., "FMPE-MAP: Improved Discriminative Adaptation for Modeling NRE Domains", Interspeech 2007, Aug. 2007. (4 pages).

* cited by examiner

REGULARIZED FEATURE SPACE DISCRIMINATION ADAPTATION

BACKGROUND

1. Technical Field

The present invention relates generally to feature spaces and, in particular, to regularized feature space discrimination adaptation.

2. Description of the Related Art

A state of the art automatic speech recognition (ASR) system is usually trained with more than a few hundred speakers in a target domain to provide robustness. Since ASR performance is highly dependent on the acoustic environment in the target domain, an acoustic model (AM) in the system should ideally be built with a large amount of target domain data. However, creating a large speech corpus for each ASR application involves enormous costs, and constructing the AM for the application from scratch takes time. Therefore, AM adaptation techniques are often used to convert a deployed system into a target domain AM with a small amount of target domain data.

Typical adaptation techniques such as maximum likelihood linear regression (MLLR) and maximum a posteriori (MAP) adapt acoustic model parameters. However, the front-end pipeline in a modern ASR system includes a discriminative feature space transform which is statistically trained with a large speech corpus to map cepstrum-based or linear discriminant analysis (LDA) features into a canonicalized (discriminative) feature space. This means that the transform depends on the acoustic conditions of the training data and should also be adapted to target a domain such as acoustic model parameters.

SUMMARY

According to an aspect of the present principles, there is provided a method for training a transformation matrix of a feature vector for an acoustic model. The method includes training the transformation matrix of the feature vector. The transformation matrix maximizes an objective function having a regularization term. The method further includes transforming the feature vector using the transformation matrix of the feature vector, and updating the acoustic model stored in a memory device using the transformed feature vector.

According to another aspect of the present principles, there is provided an apparatus for training a transformation matrix of a feature vector for an acoustic model. The apparatus includes a feature space discriminative adapter, having a processor, for training the transformation matrix of the feature vector in a given stage, and transforming the feature vector using the transformation matrix of the feature vector and updating the acoustic model using the transformed feature vector in a subsequent stage. The transformation matrix maximizes an objective function having a regularization term.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

The present principles are directed to regularized feature space discrimination adaptation. In an embodiment, the present principles disclose a method to adapt a feature space transform (e.g., feature minimum phone error (fMPE) transform) with a small amount of adaptation data.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Reference in the specification to "one embodiment" or "an embodiment" of the present principles, as well as other variations thereof, means that a particular feature, structure, characteristic, and so forth described in connection with the embodiment is included in at least one embodiment of the present principles. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Figure 1:
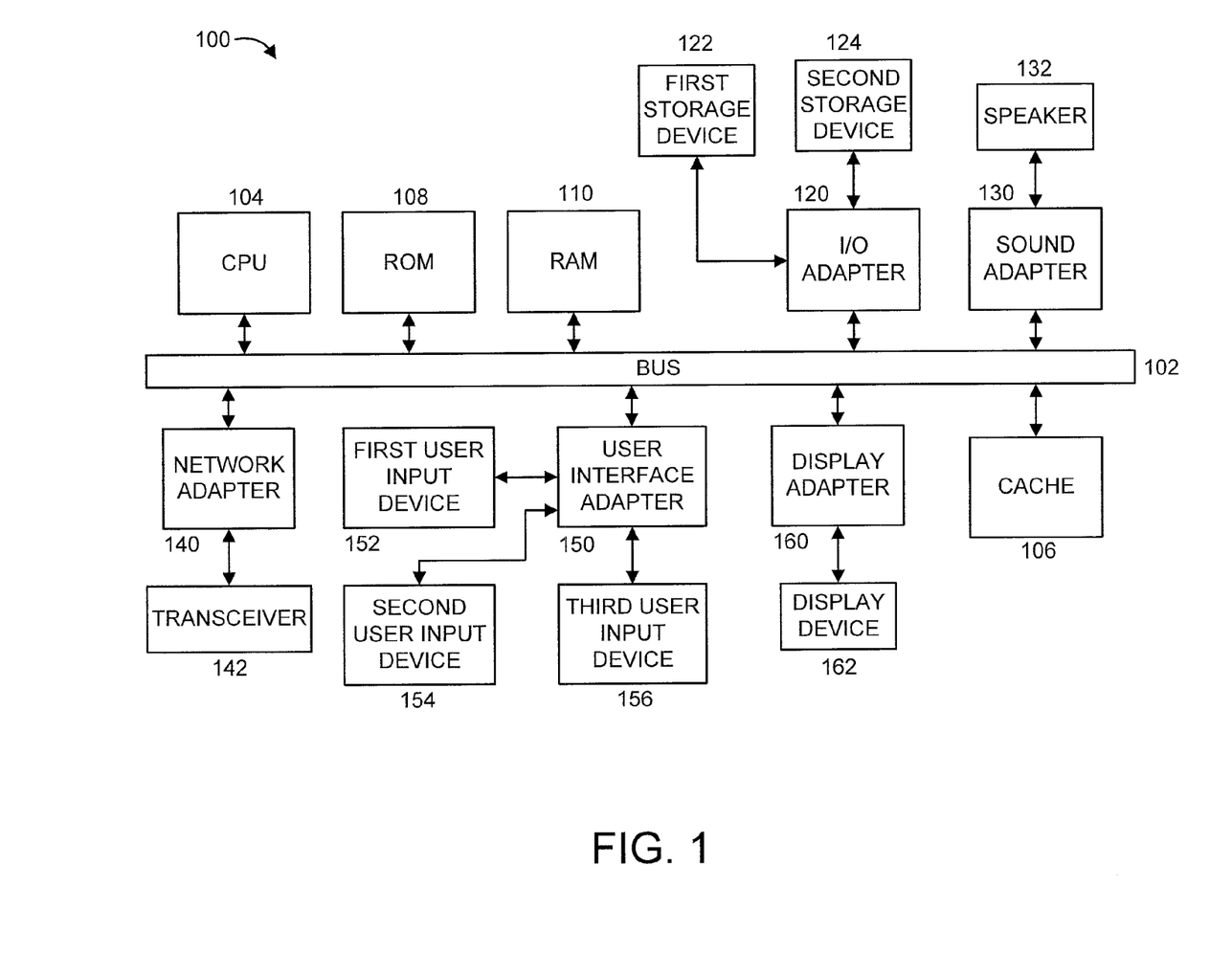
FIG. 1 shows an exemplary processing system 100 to which the present principles may be applied, in accordance with an embodiment of the present principles.

FIG. 1 shows an exemplary processing system 100 to which the present principles may be applied, in accordance with an embodiment of the present principles. The processing system 100 includes at least one processor (CPU) 104 operatively coupled to other components via a system bus 102. A cache 106, a Read Only Memory (ROM) 108, a Random Access Memory (RAM) 110, an input/output (I/O) adapter 120, a sound adapter 130, a network adapter 140, a user interface adapter 150, and a display adapter 160, are operatively coupled to the system bus 102.

A first storage device 122 and a second storage device 124 are operatively coupled to system bus 102 by the I/O adapter 120. The storage devices 122 and 124 can be any of a disk storage device (e.g., a magnetic or optical disk storage device), a solid state magnetic device, and so forth. The storage devices 122 and 124 can be the same type of storage device or different types of storage devices.

A speaker 132 is operative coupled to system bus 102 by the sound adapter 130.

A transceiver 142 is operatively coupled to system bus 102 by network adapter 140.

A first user input device 152, a second user input device 154, and a third user input device 156 are operatively coupled to system bus 102 by user interface adapter 150. The user input devices 152, 154, and 156 can be any of a keyboard, a mouse, a keypad, an image capture device, a motion sensing device, a microphone, a device incorporating the functionality of at least two of the preceding devices, and so forth. Of course, other types of input devices can also be used, while maintaining the spirit of the present principles. The user input devices 152, 154, and 156 can be the same type of user input device or different types of user input devices. The user input devices 152, 154, and 156 are used to input and output information to and from system 100.

A display device 162 is operatively coupled to system bus 102 by display adapter 160.

Of course, the processing system 100 may also include other elements (not shown), as readily contemplated by one of skill in the art, as well as omit certain elements. For example, various other input devices and/or output devices can be included in processing system 100, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the processing system 100 are readily contemplated by one of ordinary skill in the art given the teachings of the present principles provided herein.

Figure 2:
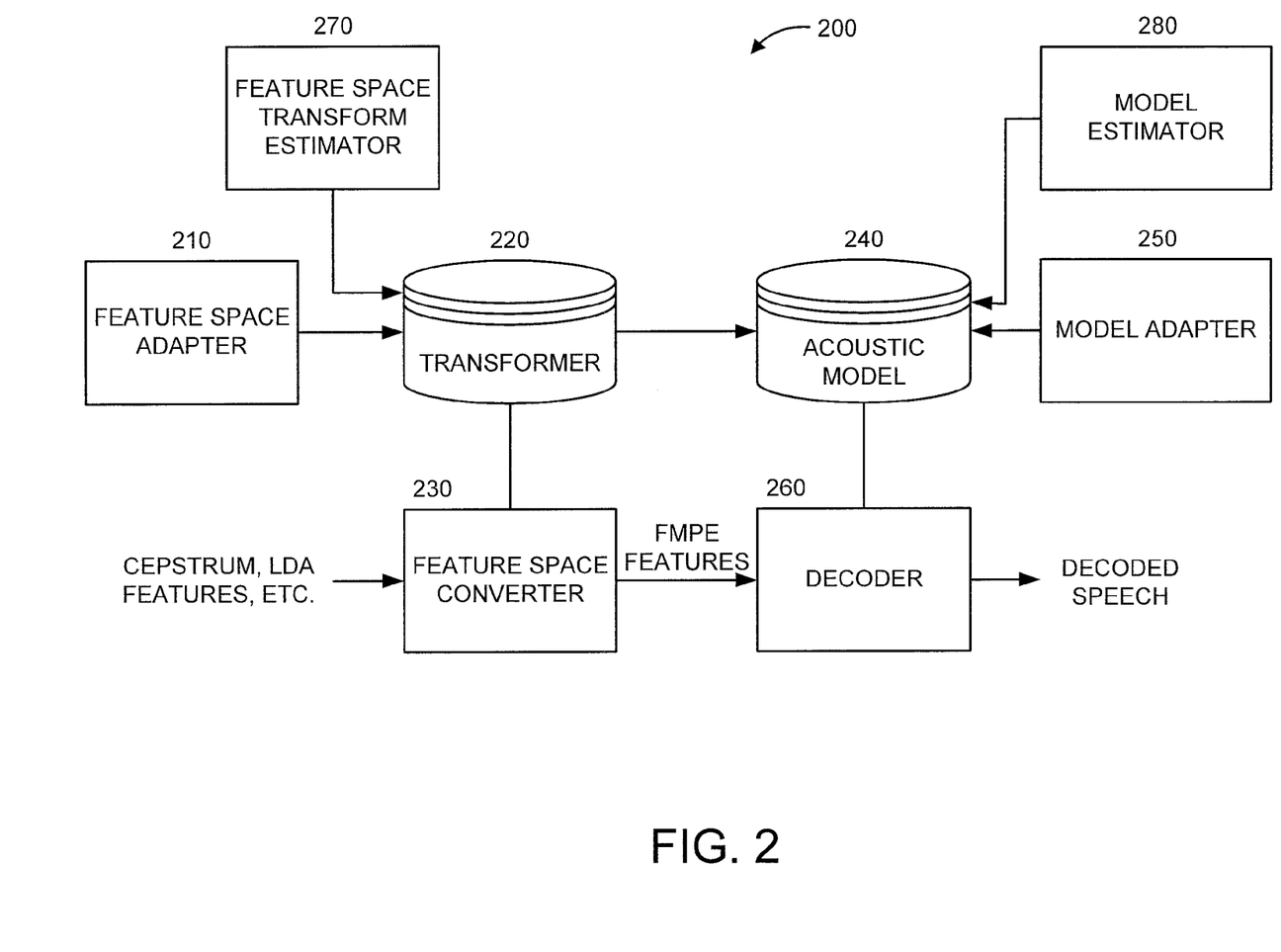
FIG. 2 shows an automatic speech recognition (ASR) system 200 with regularized feature space discrimination adaptation, in accordance with an embodiment of the present principles.

Moreover, it is to be appreciated that system 200 described below with respect to FIG. 2 is a system for implementing respective embodiments of the present principles. Part or all of processing system 100 may be implemented in one or more of the elements of system 200.

Figure 3:
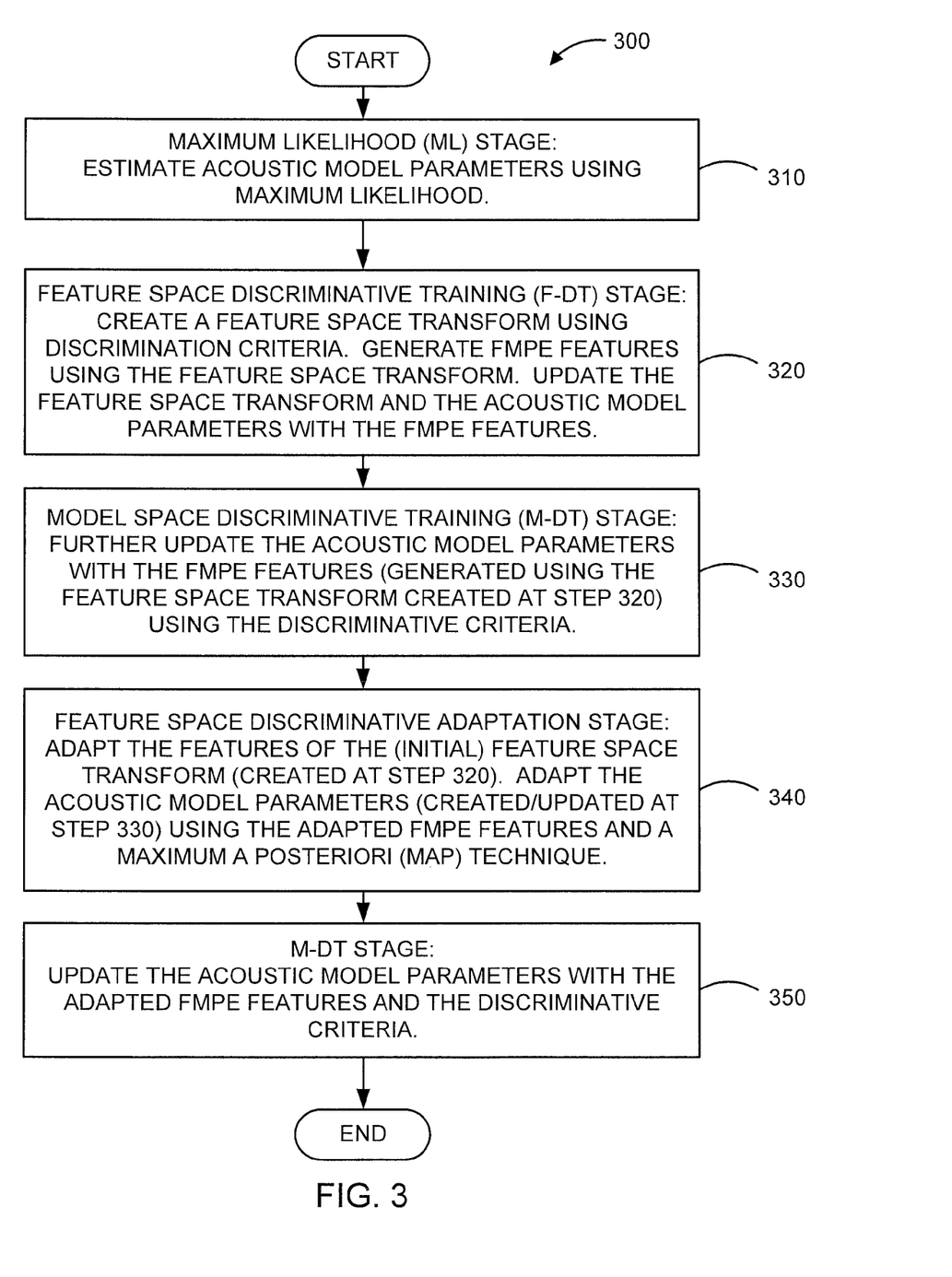
FIG. 3 shows a method 300 for training an acoustic model in an automatic speech recognition system using regularized feature space discrimination adaptation, in accordance with an embodiment of the present principles.
Figure 4:
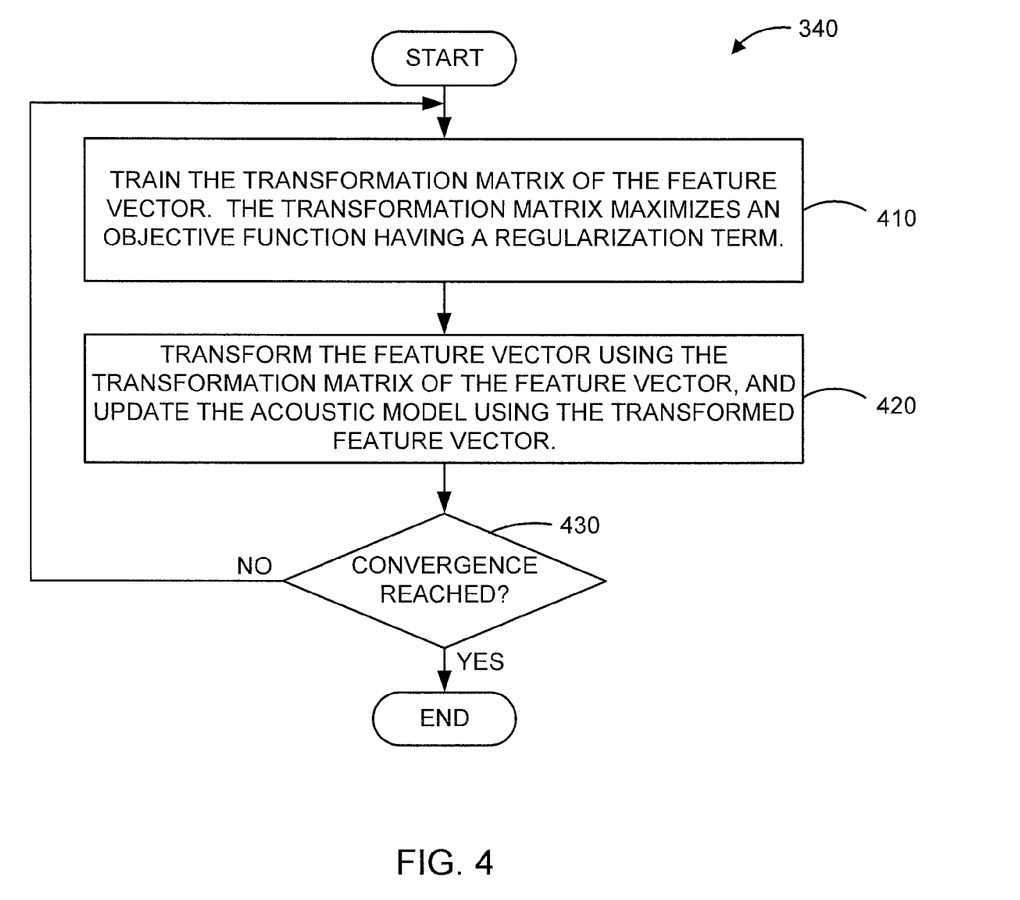
FIG. 4 shows further shows step 340 of method 300 of FIG. 3, in accordance with an embodiment of the present principles.

Further, it is to be appreciated that processing system 100 may perform at least part of the method described herein including, for example, at least part of method 300 of FIG. 3 and/or at least part of the method 400 of FIG. 4. Similarly, part or all of system 200 may be used to perform at least part of method 300 of FIG. 3 and/or at least part of method 400 of FIG. 4.

FIG. 2 shows an automatic speech recognition (ASR) system 200 with regularized feature space discrimination adaptation, in accordance with an embodiment of the present principles. The system 200 includes a feature space adapter 210, a transform database 220, a feature space converter 230, an acoustic model 240, a model adapter 250, a decoder 260, a feature space transform estimator 270, and an acoustic model estimator 280.

In the embodiment of FIG. 2, the transform database 220 includes one or more transforms such as, for example, one or more feature minimum phone error (fMPE) transforms. The feature space adapter 210 adapts the transforms in the transform database 220. While referred to in part as a database, the transform database 220 can include additional functionality to create and/or update transforms in addition to simply storing transforms. The feature space transform estimator 270 updates feature space transforms. The acoustic model estimator 280 estimates parameters of the acoustic model. The model adapter 250 adapts the parameters of the acoustic model 240. The model adapter can involve, but is not limited to, the use of maximum likelihood linear regression (MLLR) and maximum a posteriori (MAP) techniques to adapt parameters of the acoustic model 240. The feature space converter 230 receives cepstrum features, linear discriminant analysis (LDA) features, and/or other types of features, and converts the preceding into fMPE features. The fMPE features are provided to the decoder 260 which provides an output that includes decoded speech (e.g., a transcript). These and other variations of the elements of system 200 are readily determined by one of ordinary skill in the art given the teachings of the present principles provided herein, while maintaining the spirit of the present principles.

FIG. 3 shows a method 300 for training an acoustic model in an automatic speech recognition system using regularized feature space discrimination adaptation, in accordance with an embodiment of the present principles. Each of the depicted steps 310 through 350 can be considered to be and/or otherwise correspond to a respective training stage. It is to be appreciated that at least a processor (e.g., CPU 104) can be used to perform any of steps 310 through 350.

At step 310, in a maximum likelihood (ML) stage, estimate acoustic model parameters using maximum likelihood. Thus, referring back to FIG. 2, the cepstrum features, the LDA features, and/or other features shown input to the feature space converter 230 are used at step 310 to estimate/create the acoustic model responsive to maximum likelihood criteria. The acoustic model 240 is estimated/created by the acoustic model estimator 280.

At step 320, in a feature space discriminative training (F-DT) stage, create a feature space transform (fMPE) using discriminative criteria (e.g., including, but not limited to, minimum phone error (MPE) and maximum mutual information (MMI)). Additionally at step 320, generate fMPE features using the feature space transform. Moreover, at step 320 (i.e., also in the F-DT stage), iteratively update the feature space transform and the acoustic model parameters with the fMPE features. Maximum Likelihood (ML) criterion is used for the model update. Thus, referring back to FIG. 2, at step 320, the feature space transform is stored in the transformer 220 and the updated acoustic model parameters are stored in the acoustic model 240. The feature space transform is updated by the feature-space transform estimator 270 and the acoustic model parameters are updated by the acoustic model estimator 280.

At step 330, in a model space discriminative training (M-DT) stage, further update the acoustic model parameters with the fMPE features (generated using the feature space transform (created at step 320)), e.g., using the discriminative criteria (MPE or MMI). Thus, referring back to FIG. 2, the acoustic model parameters are updated using the fMPE features at step 330 by the acoustic model estimator 280.

An acoustic model can be output from step 330 that can serve in a deployed ASR system. However, the present principles advantageously further involve performing feature space discriminative adaptation so that the acoustic model is optimized for an intended target domain. This further feature space transform is implicated by at least steps 340 and 350.

At step 340, in a feature space discriminative adaptation stage, adapt the features of the (initial) feature space transform (fMPE) created at step 320. Additionally, in step 340 (i.e., also in the feature space discriminative adaptation stage), adapt the acoustic model parameters created/updated at step 330 using adapted fMPE features and a maximum a posteriori (MAP) technique. Thus, referring back to FIG. 2, the features of the (initial) feature space transform are adapted by the feature space adapter 210 at step 340, and the acoustic model parameters are adapted by the model adapter 250 at step 340.

At step 350, in another model space discriminative training (M-DT) stage, update the acoustic model parameters with the adapted fMPE features and the discriminative criteria. Thus, referring back to FIG. 2, the acoustic model parameters are updated using the adapted fMPE features and the discriminative criteria at step 350 by the acoustic model estimator 280.

Thus, in the pipeline, the feature space transform is designed in a feature space discriminative training (F-DT) stage with discriminative criterion such as MPE and MMI, followed by model space DT (M-DT) with fMPE features generated from the transform. A deployed system is usually trained with a large speech corpus.

The proposed method regards the fMPE transform in the deployed system created at step 320 as an initial transform and adapts the initial transform to the target domain by retraining the transform (at step 340) with a small amount of target-domain adaptation data.

In the feature space discriminative adaption stage in accordance with the present principles (as per step 340), the model parameter update is based on a MAP approach since the adapted fMPE features critically differ from original fMPE features. Lastly, model space DT is performed (at step 350) with the adapted fMPE features.

However, changing original large training data for fMPE into small adaptation data can cause performance degradation because of a data sparseness issue.

Since the parameter size of the acoustic model (# of Gaussians and states) is very large as compared to the adaptation data size, the transform is easily over-trained. This is because an objective function of fMPE is based on numerator- and denominator-statistics from all states in the model on indirect differential computation. In other words, the small adaptation data is not enough to cover all the states. Thus, the statistics have little reliably for many of the states.

Advantageously in accordance with an embodiment of the present principles, a regularization parameter is introduced to give a penalty for unreliable statistics due to low counts as follows. Equation (2) below represents the change of objective function F caused by variations of Gaussian means and variances that are indirectly related to the variation of i-th dimensional transformed feature vector in accordance with the prior art, while Equation (3) advantageously represents the change of F with a confidence based on a data amount in accordance with an embodiment of the present principles.

$$M'_{ij} = M_{ij} + v_{ij} \frac{\partial F}{\partial M_{ij}}, \quad (1)$$

$$\frac{\partial F}{\partial M_{ij}} = \sum_{t=1}^{T} \frac{\partial F}{\partial y_{ti}} h_{tj} = \sum_{t=1}^{T} \left( \frac{\partial F^{direct}}{\partial y_{ti}} + \frac{\partial F^{indirect}}{\partial y_{ti}} \right) h_{tj}$$

$$\frac{\partial F^{indirect}}{\partial y_{ti}} = \sum_{s=1}^{S} \sum_{m=1}^{M_s} \frac{\gamma_{sm}(t)}{\gamma_{sm}} \left\{ \frac{\partial F}{\partial \mu_{smi}} + 2 \frac{\partial F}{\partial \sigma^2_{smi}} (y_{ti} - \mu_{smi}) \right\} \quad (2)$$

$$\frac{\partial F^{indirect}}{\partial y_{ti}} = \sum_{s=1}^{S} \sum_{m=1}^{M_s} \frac{\gamma_{sm}(t)}{\gamma_{sm}} \left\{ \frac{\partial F}{\partial \mu_{smi}} + 2 \frac{\partial F}{\partial \sigma^2_{smi}} (y_{ti} - \mu_{smi}) \right\} \cdot \rho(\gamma^{num}_{sm}, \gamma^{den}_{sm}) \quad (3)$$

where $M_{ij}$ denotes a fMPE transform, $h_{tj}$ denotes a high-dimensional posterior vector, S denotes the number of states, $M_s$ denotes the number of Gaussians in the states, $\gamma^{num}_{smi}$ and $\gamma^{den}_{smi}$ respectively denote MPE statistics on numerator and denominator lattices, and $\rho(\gamma^{num}_{sm}, \gamma^{den}_{sm})$ is the regularization term ranging from 0 to 1.

This function $\rho(\gamma^{num}_{sm}, \gamma^{den}_{sm})$ takes zero when $\gamma^{num}_{sm}$, $\gamma^{den}_{sm}$ are small.

FIG. 4 further shows step 340 of method 300 of FIG. 3, in accordance with an embodiment of the present principles. At step 410, train the transformation matrix of the feature vector. The transformation matrix maximizes an objective function having a regularization term. At step 420, transform the feature vector using the transformation matrix of the feature vector, and update the acoustic model using the transformed feature vector. At step 430, it is determined if convergence has been reached. If so, then the method is terminated (to thus proceed to step 350 of method 300 of FIG. 3). Otherwise, steps 410 and 420 are repeated.

A description will now be given regarding the performance of various embodiments of the present principles with respect to TABLE 1. TABLE 1 shows the performance of various acoustic model training approaches with respect to data size and word error rate (WER) percentage.

TABLE 1

| Training approach | | Data size | WER % |
| --- | --- | --- | --- |
| Baseline A | ASR trained with large handheld corpus | — | 17.66 |
| Baseline B | MAP adaptation with automotive data from Baseline A | 60 hours | 16.04 |
| R1 | Feature space discriminative adaptation (Regularization ON, MAP update for AM) | 60 hours | 15.43 |
| R1-a | Feature space discriminative adaptation (Regularization OFF, ML update for AM) | 60 hours | 23.20 |
| R1-b | Feature space discriminative adaptation (Regularization OFF, MAP update for AM) | 60 hours | 18.96 |
| R1-c | Feature space discriminative adaptation (Regularization ON, ML update for AM) | 60 hours | 17.31 |
| R2 | R1 + model space DT | 60 hours | 15.33 |

Baseline A acoustic model was trained with a large amount of speech data recorded with hand-held devices via the Internet. Testing data is recorded in automobile environments (cross-domain). Baseline B acoustic model is the result from a MAP adaptation (standard model space adaptation) with automotive data.

R1 is the proposed method with feature space discriminative adaptation. This outperforms the conventional MAP-adapted model (Baseline B). R1-a and R1-b are feature space discriminative adaptation without using the regularization proposed herein. Unless the regularization is used, the performance is much worse than baseline B because of data sparseness against acoustic model (AM) size. Both the regularization and the MAP update of the model are needed to yield high performance (R1, R1-a, R1-b, R1-c).

R2 is the result from model space DT with adapted fMPE features.

The performance will be further improved by combining standard regularization techniques such as L1 and L2 regularization.

Thus, in accordance with the present principles, we adapt a fMPE transform with target domain data by changing the training data between the deployed system and the feature-space discriminative adaptation stage. Moreover, unlike other approaches than train fMPE transforms from scratch (starting right after the ML stage), the present principles regard the fMPE transform trained with a large corpus as the initial transform. The learning rate is used to adjust the adaptation rate of the transform.

In prior studies of fMPE adaptation, a training data set for fMPE is well-balanced against model parameters to avoid data sparseness issue. In contrast, our training data set between the original one (more than 5 k hours) and adaptation data (only 60 hours) is greatly different. A large adaptation data set is not necessary in our method because we introduce the regularization term in fMPE transform estimation in order to avoid the data sparseness issue.

A description will now be given of various formulae used in accordance with one or more embodiments of the present principles.

Gradient decent optimization is applied to update the fMPE transform $M_{ij}$ as follows:

$$M'_{ij} = M_{ij} + v_{ij} \frac{\partial F}{\partial M_{ij}}, \quad (1)$$

$$\frac{\partial F}{\partial M_{ij}} = \sum_{t=1}^{T} \frac{\partial F}{\partial y_{ti}} h_{tj} = \sum_{t=1}^{T} \left( \frac{\partial F^{direct}}{\partial y_{ti}} + \frac{\partial F^{indirect}}{\partial y_{ti}} \right) h_{tj}$$

-continued $$\frac{\partial F^{indirect}}{\partial y_{ti}} = \sum_{s=1}^{S}\sum_{m=1}^{M_s} \frac{\gamma_{sm}(t)}{\gamma_{sm}}\left\{\frac{\partial F}{\partial \mu_{smi}} + 2\frac{\partial F}{\partial \sigma_{smi}^2}(t_{ti} - \mu_{smi})\right\} \cdot \rho(\gamma_{sm}^{num}, \gamma_{sm}^{den}) \quad (3)$$

$$\frac{\partial F}{\partial \mu_{smi}} = \frac{K}{\sigma_{smi}^2}\{\theta_{smi}^{num}(O) - \theta_{smi}^{den}(O) - \mu_{smi}(\gamma_{sm}^{num} - \gamma_{sm}^{den})\}$$

$$\frac{\partial F}{\partial \sigma_{smi}^2} = \frac{K\gamma_{sm}^{num}}{2}(S_{smi}^{num}\sigma_{smi}^{-4} - \sigma_{smi}^{-2}) - \frac{K\gamma_{sm}^{den}}{2}(S_{smi}^{den}\sigma_{smi}^{-4} - \sigma_{smi}^{-2})$$

$$S_{smi}^{num} = \frac{\{\theta_{smi}^{num}(O^2) - 2\theta_{smi}^{num}(O)\mu_{smi} + \gamma_{sm}^{num}\mu_{smi}\}}{\gamma_{sm}^{num}}$$

where $M_{ij}$ denotes a fMPE transform, $h_{tj}$ denotes a high-dimensional posterior vector, S denotes the number of states, $M_s$ denotes the number of Gaussians in the states, $\theta_{smi}^{num}$, $\theta_{smi}^{den}$ respectively denotes the sum of data on the numerator and denominator lattices, $\gamma_{smi}^{num}$ and $\gamma_{smi}^{den}$ respectively denote MPE statistics on the numerator and denominator lattices, and $\rho(\gamma_{sm}^{num}, \gamma_{sm}^{den})$ is the regularization term ranging from 0 to 1.

Unless the adaptation data size is large enough, $\theta_{smi}^{num}$, $\theta_{smi}^{den}, \gamma_{smi}^{num}, \gamma_{smi}^{den}$ are statistically unreliable. As a result, the transform is easily over-trained. Therefore, in accordance with an embodiment of the present principles, we introduce the regularization term to indirect differential computation. Any regularization function can be used in accordance with the teachings of the present principles as long as it takes a value close to zero when $\gamma_{smi}^{num}, \gamma_{smi}^{den}$ are small.

A description will now be given of a role of the regularization term ρ½, in accordance with an embodiment of the present principles.

The conventional fMPE generates a new feature vector $y_t$ at time t by calculating a bias for an original feature vector $x_t$ with a linear transformation matrix M and high-dimensional posterior vector $h_t$, and adding the bias to the original vector $x_t$ as follows: $y_t = x_t + Mh_t$.

The fMPE estimation procedure finds the value of M that maximizes the MPE objective function $F_{MPE}$ as follows:

$$M^* = \underset{M}{\mathrm{argmax}} F_{MPE}(y, \lambda),$$

where y is the transformed feature vector sequence, and λ is a set of acoustic model parameter (means and variances, and so forth). Each component of the transformation matrix M is sequentially updated by gradient decent optimization because $h_t$ is a high-dimensional vector, as follows:

$$M'_{ij} = M_{ij} + v_{ij}\frac{\partial F}{\partial M_{ij}},$$

where $v_{ij}$ is a learning rate. The differential term in the equation above is divided into a "direct" differential and an "indirect" differential as follows:

$$\frac{\partial F}{\partial M_{ij}} = \sum_{t=1}^{T}\frac{\partial F}{\partial y_{ti}}h_{tj} = \sum_{t=1}^{T}\left(\frac{\partial F^{direct}}{\partial y_{ti}} + \frac{\partial F^{indirect}}{\partial y_{ti}}\right)h_{tj}$$

where $y_{ti}$ is an i-th component in the feature vector after transformation, and $h_{tj}$ is a j-th component in a posterior vector. A value of the direct differential term is associated with a change in the objective function F directly caused by variations of y. In contrast, a value of the indirect differential is associated with a change of the objective function F caused by variations of the acoustic model parameters (means and variances for Gaussian) that indirectly relate to variations of y. In the fMPE process, acoustic model parameters are also updated in addition to the transform of feature vector.

A description will now be given of a role of the regularization term ρ 2/2, in accordance with an embodiment of the present principles.

The indirect differential can be reformulated as statistics computed from all parameters (all Gaussians) in the acoustic model as follows:

$$\frac{\partial F^{indirect}}{\partial y_{ti}} = \sum_{s=1}^{S}\sum_{m=1}^{M_s} \frac{\gamma_{sm}(t)}{\gamma_{sm}}\left\{\frac{\partial F}{\partial \mu_{smi}} + 2\frac{\partial F}{\partial \sigma_{smi}^2}(y_{ti} - \mu_{smi})\right\} \quad (2)$$

where $\mu_{smi}$ is an i-th component of a mean vector in state s and Gaussian m. $\sigma_{smi}$ is a variance. fMPE is easily over-trained when there is not enough adaptation data because fMPE utilizes statistics from all components in the acoustic model. In other words, when the enough amount of adaptation data is not available, a part of statistics from specific Gaussians is unreliable. Therefore, the present principles control fMPE training by adding new parameter ρ to avoid overtraining as follows:

$$\frac{\partial F^{indirect}}{\partial y_{ti}} = \sum_{s=1}^{S}\sum_{m=1}^{M_s} \frac{\gamma_{sm}(t)}{\gamma_{sm}}\left\{\frac{\partial F}{\partial \mu_{smi}} + 2\frac{\partial F}{\partial \sigma_{smi}^2}(y_{ti} - \mu_{smi})\right\} \cdot \rho(\gamma_{sm}^{num}, \gamma_{sm}^{den}) \quad (3)$$

where $\rho(\gamma_{sm}^{num}, \gamma_{sm}^{den})$ is the proposed regularization term, $\gamma_{smi}^{num}, \gamma_{smi}^{den}$ relate to training data size (number of frames) in a state s, and Gaussian m. The preceding is the same Equation (3) from above, but presented here again given its applicability to the description of the role of the regularization term ρ 2/2. The regularization term takes a small value as a penalty when there is no sufficient training data for the Gaussian.

A description will now be given of an acoustic model update by MAP criterion, in accordance with an embodiment of the present principles.

Normally in the fMPE process, both the fMPE transform and the acoustic model parameters are gradually updated by performing two following processes in turn. First, train the transformation matrix M that maximizes the objective function FMPE. Second, convert the original feature vector with transformation matrix M and re-train acoustic model with the transformed feature vector. In the AM update stage (the second stage), the maximum likelihood (ML) criterion is usually used while in the proposed method, MAP criterion is applied instead. MAP is a method that interpolates an old acoustic model with new statistics and moderately updates the acoustic model. In the ML approach, the acoustic model update is not directly dependent on the old model.

A description will now be given of an initial value of transformation matrix M, in accordance with an embodiment of the present principles. In the conventional method, a value generated by a specific rule is used as an initial value of transformation matrix M. In contrast, in the proposed method, the transformation matrix M estimated in an original environment before adaptation (so to speak a pre-trained transform) is used as the initial value.

A description will now be given of various specific examples of ρ, in accordance with an embodiment of the present principles.

A first example of ρ, hereinafter denoted ρ(1), pertains to the case of a Sigmoid function as follows:

$$\rho(\gamma_{sm}^{num}, \gamma_{sm}^{den}) = \frac{1}{1 + \exp(-\alpha\beta_{sm} + \varepsilon)}$$

$$\beta_{sm} = \gamma_{sm}^{num}$$

if $\gamma_{sm}^{num} \leq \gamma_{sm}^{den}$ otherwise $$\beta_{sm} = \gamma_{sm}^{den}$$

$$0 < \rho(\gamma_{smi}^{num}, \gamma_{smi}^{den}) < 1$$

where α denotes a gain coefficient, ε denotes a shift coefficient, βsm denotes a training data size (State s, Gaussian m). An advantage of the first example is that it can give a granular penalty using βsm in comparison to a step function. Values of $\gamma_{smi}^{num}$, $\gamma_{smi}^{den}$ are statistically almost the same. A disadvantage of the first example is that there is a need to adjust both α and ε.

A second example of ρ, hereinafter denoted ρ(2), pertains to the case of a step function as follows:

$$\rho(\gamma_{smi}^{num}, \gamma_{smi}^{den}) = u(\beta sm)$$

u(βsm)=1 if βsm>ε u(βsm)=0 if βsm≤ε where $$\beta_{sm} = \gamma_{sm}^{num}$$

if $\beta_{sm}^{num} \leq \gamma_{sm}^{den}$ otherwise $$\beta_{sm} = \gamma_{sm}^{den}$$

where ε denotes a threshold. An advantage of the second example is that it is easy to adjust the parameter. A disadvantage of the second example is that the accuracy of the penalty is lower than the sigmoid function case because of a "rough" penalty. However, it is negligible in terms of ASR performance.

The parameters in the first and second examples of ρ are estimated with a small amount of tuning set.

A description will now be given of a simplification to the update formula, in accordance with an embodiment of the present principles.

Conventional feature space discriminative training is expressed as follows:

$$M'_{ij} = M_{ij} + v_{ij} \sum_{t=1}^{T} \sum_{s=1}^{S} \sum_{m=1}^{M_s} (D_{tsm} + I_{tsm})$$

where t, s, and m denote indices of frames, states, and Gaussians, respectively, and $D_{t,s,m}$ is a direct differential term while $I_{t,s,m}$ is an indirect differential term.

The transformation matrix in an embodiment of the present principles is updated as follows:

$$M'_{ij} = M_{ij} + v_{ij} \sum_{t=1}^{T} \sum_{s=1}^{S} \sum_{m=1}^{M_s} (D_{tsm} + I_{tsm}\rho(\beta_{sm}))$$

The indirect differential term $I_{t,s,m}$ is multiplied by the regularization term ρ to reduce a bad effect on a small data set because it causes a divergence of M'.

A description will now be given regarding direct and indirect differentials, in accordance with an embodiment of the present principles.

Regarding the direct differential, the following applies:

$$D_{tsm} = h_{ij} \frac{\partial F}{\partial l_{smt}} \frac{\partial l_{smt}}{\partial y_{ti}},$$

where $l_{smt}$ denotes a log likelihood at time t, state s, and Gaussian m, and $y_{ti}$ denotes the i-th component of a transformed feature vector at time t.

Regarding the indirect differential, the following applies:

$$I_{tsm} = h_{ij} \frac{\gamma_{sm}(t)}{\gamma_{sm}} \left( \frac{\partial F}{\partial \mu_{smi}} + 2 \frac{\partial F}{\partial \sigma_{smi}^2} (y_{ti} - \mu_{smi}) \right)$$

where $\gamma_{sm}(t)$ denotes occupation probability at time t, $\gamma_{sm}$ denotes occupation probability for all training data; $\mu_{msi}$ denotes an i-th component of a mean vector in state s and Gaussian m, and σmsi denotes an i-th component of a variance vector in state s and Gaussian m.

Having described preferred embodiments of a system and method (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A method for training a transformation matrix of a feature vector for an acoustic model, comprising:
    (a) extracting the feature vector from a speech signal;
    (b) training the transformation matrix of the feature vector, the transformation matrix maximizing an objective function having a regularization term; and
    (c) transforming the feature vector using the transformation matrix of the feature vector, and updating the acoustic model stored in a memory device using the transformed feature vector,
    wherein the regularization term controls an amount of change in the transformation matrix relating to a given statistical parameter, the regularization term reduces the amount of change in the transformation matrix relating to the given statistical parameter when the transformation matrix of the feature vector is updated and an amount of training data for the given statistical parameter is less than a threshold amount representative of data sparseness, and the method is performed by an automatic speech recognition system.

2. The method of claim 1, wherein said updating of the acoustic model is based on a maximum a posteriori technique.

3. The method of claim 2, wherein said updating of the acoustic model comprises interpolating values for the updated acoustic model using a previous version of the acoustic model and updated statistics such that the updated acoustic model is dependent upon the previous version of the acoustic model.

4. The method of claim 1, wherein steps (a) and (b) are repeated to respectively update the transformation matrix of the feature vector and to update statistical parameters of the acoustic model until convergence is reached.

5. The method of claim 1, further comprising performing an initial training of the transformation matrix using a given amount of initial training data prior to said step (a), and wherein said step (a) trains the transformation matrix of the feature vector using an amount of training data less than the given amount of initial training data used for the initial training.

6. The method of claim 1, wherein the regularization term comprises a direct differential term and an indirect differential term, and wherein a value of the direct differential term is associated with a change in the objective function directly caused by a variation of at least one component of the feature vector while a value of the indirect differential term is associated with a change in the objective function caused by a variation of at least one acoustic model parameter indirectly relating to the variation of the at least one component of the feature vector.

7. The method of claim 1, further comprising performing discriminative training of the transformation matrix of the feature vector using a given amount of initial training data prior to said step (a), and wherein said step (a) trains the transformation matrix of the feature vector obtained as an output of the discriminative training.

8. The method of claim 1, wherein the objective function comprises a learning rate term for controlling an adaptation rate of the transformation matrix.

9. A non-transitory article of manufacture tangibly embodying a computer readable program which when executed causes a computer to perform the steps of claim 1.

10. An apparatus for training a transformation matrix of a feature vector for an acoustic model, comprising:
  a feature space discriminative adapter, having a processor, for extracting the feature vector from a speech signal and training the transformation matrix of the feature vector in a given stage, and transforming the feature vector using the transformation matrix of the feature vector in a subsequent state; and
  an acoustic model estimator for updating the acoustic model using the transformed feature vector in the subsequent stage,
  wherein the transformation matrix maximizes an objective function having a regularization term, the regularization term controls an amount of change in the transformation matrix relating to a given statistical parameter, the regularization term reduces the amount of change in the transformation matrix relating to the given statistical parameter when the transformation matrix of the feature vector is updated and an amount of training data for the given statistical parameter is less than a threshold amount representative of data sparseness, and the apparatus is comprised in an automatic speech recognition system.

11. The apparatus of claim 10, wherein the acoustic model is updated using a maximum a posteriori technique.

12. The apparatus of claim 11, wherein the acoustic model is updated by interpolating values there for using a previous version of the acoustic model and updated statistics such that the updated acoustic model is dependent upon the previous version of the acoustic model.

13. The apparatus of claim 10, wherein an initial training of the transformation matrix is performed using a given amount of initial training data prior to the given stage, and wherein the transformation matrix of the feature vector is trained in the given stage using an amount of training data less than the given amount of initial training data used for the initial training.

14. The apparatus of claim 10, wherein the regularization term comprises a direct differential term and an indirect differential term, and wherein a value of the direct differential term is associated with a change in the objective function directly caused by a variation of at least one component of the feature vector while a value of the indirect differential term is associated with a change in the objective function caused by a variation of at least one acoustic model parameter indirectly relating to the variation of the at least one component of the feature vector.

15. The apparatus of claim 10, further comprising a feature space adapter for performing discriminative training of the transformation matrix of the feature vector using a given amount of initial training data prior to the given stage, and wherein the transformation matrix obtained as an output of the discriminative training is trained in the given stage.

16. The apparatus of claim 10, wherein the objective function comprises a learning rate term for controlling an adaptation rate of the transformation matrix.

* * * * *